US009849529B2

(12) United States Patent
Yoshizaki et al.

(10) Patent No.: US 9,849,529 B2
(45) Date of Patent: Dec. 26, 2017

(54) WIRE ELECTRICAL DISCHARGE MACHINE HAVING UPPER/LOWER GUIDE THERMAL DISPLACEMENT CORRECTION FUNCTION

(71) Applicant: FANUC Corporation, Yamanashi (JP)

(72) Inventors: Daisuke Yoshizaki, Tamanashi (JP); Yoshinori Makino, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 309 days.

(21) Appl. No.: 14/676,883

(22) Filed: Apr. 2, 2015

(65) Prior Publication Data

US 2015/0283636 A1    Oct. 8, 2015

(30) Foreign Application Priority Data

Apr. 3, 2014    (JP) .................................. 2014-077264

(51) Int. Cl.
*B23H 7/20*    (2006.01)
*G05B 19/404*    (2006.01)
(Continued)

(52) U.S. Cl.
CPC ................ *B23H 7/20* (2013.01); *B23H 7/02* (2013.01); *B23H 7/18* (2013.01); *G05B 19/404* (2013.01);
(Continued)

(58) Field of Classification Search
CPC ... B23H 7/20; B23H 7/02; B23H 7/18; B23H 2500/20; B23H 7/06; G05B 19/404;
(Continued)

(56) References Cited

U.S. PATENT DOCUMENTS 4,363,949 A * 12/1982 Pfau ........................ B23H 7/06
219/69.12
4,485,449 A    11/1984 Knauss
(Continued)

FOREIGN PATENT DOCUMENTS

CN    103391827 A    11/2013
EP    2181791 A2    5/2010
(Continued)

OTHER PUBLICATIONS

Chattopadhyay, K.D.; Verma, S.; Satsangi, P.S. and Sharma, P.C., "Development of empirical model for different process parameters during rotary electrical discharge machining of copper—steel (EN-8) system", 2009, Journal of Materials Processing Technology, 209, 1454-1465.*

(Continued)

*Primary Examiner* — Mohammad Ali
*Assistant Examiner* — Kelvin Booker
(74) *Attorney, Agent, or Firm* — Hauptman Ham, LLP

(57) ABSTRACT

There is provided a wire electrical discharge machine that includes a temperature detection unit, an actual position correction amount calculation unit, a correction amount calculation unit, a correction amount adjustment unit, a position correction amount adjustment unit, and a corrective movement amount calculation unit. The actual position correction amount calculation unit calculates an actual position correction amount for an upper/lower guide section in accordance with reference position coordinates at a reference temperature and with actual position coordinates at a temperature different from the reference temperature. The correction amount calculation unit uses a prepared correction amount arithmetic expression. The correction amount adjustment unit calculates a correction amount adjustment (Continued)

value from the actual position correction amount and the position correction amount.

4 Claims, 5 Drawing Sheets

(51) Int. Cl.
    *B23H 7/02*     (2006.01)
    *B23H 7/18*     (2006.01)
    *B23H 7/06*     (2006.01)

(52) U.S. Cl.
    CPC ............ *B23H 7/06* (2013.01); *B23H 2500/20* (2013.01); *G05B 2219/45043* (2013.01); *G05B 2219/49206* (2013.01); *G05B 2219/49207* (2013.01)

(58) Field of Classification Search
    CPC ........... G05B 2219/49207; G05B 2219/45043; G05B 2219/49206
    See application file for complete search history.

(56) References Cited

U.S. PATENT DOCUMENTS

| | | | | |
|---|---|---|---|---|
| 4,495,393 A * | 1/1985 | Janicke | .................. | B23H 7/101 219/69.12 |
| 4,508,604 A * | 4/1985 | Inoue | ....................... | B23H 7/08 204/206 |
| 4,520,252 A * | 5/1985 | Inoue | ..................... | B23H 7/101 219/69.14 |
| 4,581,513 A * | 4/1986 | Obara | .................... | B23H 7/101 204/206 |
| 4,675,491 A * | 6/1987 | Marendaz | ................. | B23H 7/04 219/69.12 |
| 4,857,688 A * | 8/1989 | Aso | .......................... | B23H 1/10 137/563 |
| 5,196,666 A * | 3/1993 | Hosaka | .................. | B23H 7/101 219/69.12 |
| 5,523,953 A | 6/1996 | Araie et al. | | |
| 5,605,638 A * | 2/1997 | Fujita | ....................... | B23H 7/02 219/69.12 |
| 5,660,579 A * | 8/1997 | Nakayama | ............. | B24D 18/00 125/11.01 |
| 6,008,461 A * | 12/1999 | Iezawa | ..................... | B23H 1/02 219/69.12 |
| 6,344,624 B1 * | 2/2002 | Moro | ....................... | B23H 7/02 219/69.12 |
| 6,533,927 B1 * | 3/2003 | Hosaka | .................... | B23H 1/10 210/167.01 |
| 6,833,523 B2 * | 12/2004 | Kimura | .................... | B23H 7/36 219/69.12 |
| 7,465,899 B2 * | 12/2008 | Kita | ......................... | B23H 1/10 219/69.12 |
| 2005/0058954 A1 * | 3/2005 | Okada | ....................... | B41J 2/32 430/348 |
| 2005/0242065 A1 * | 11/2005 | Kita et al. | .............. | B23H 7/104 219/69.12 |
| 2005/0265854 A1 * | 12/2005 | Arakawa et al. | ......... | B23H 1/10 417/243 |
| 2005/0267624 A1 * | 12/2005 | Kita et al. | .............. | B23H 7/108 700/175 |
| 2006/0065637 A1 * | 3/2006 | Kita et al. | .............. | B23H 7/107 219/69.12 |
| 2007/0175814 A1 * | 8/2007 | Kita | .......................... | B23H 7/36 210/421 |
| 2008/0053963 A1 * | 3/2008 | Kita et al. | .............. | B23H 7/104 219/69.12 |
| 2008/0217300 A1 * | 9/2008 | Kita et al. | .............. | B23H 7/104 219/69.12 |
| 2009/0228723 A1 * | 9/2009 | Yoshizaki | ............... | H04L 12/10 713/300 |
| 2012/0228201 A1 * | 9/2012 | Kasai | ........................ | B23H 1/10 210/108 |
| 2013/0248494 A1 * | 9/2013 | Inaba et al. | .............. | B23H 1/10 219/69.12 |
| 2013/0325164 A1 | 12/2013 | Wwatanabe et al. | | |
| 2014/0083536 A1 * | 3/2014 | Yoshizaki | ................ | B23H 1/10 137/565.17 |
| 2014/0197138 A1 * | 7/2014 | Yoshizaki | .............. | B23H 7/065 219/69.12 |
| 2015/0273601 A1 * | 10/2015 | Kasai et al. | ........... | B23H 7/101 219/69.14 |
| 2016/0167147 A1 * | 6/2016 | Yoshizaki | .............. | B23H 11/00 219/69.11 |
| 2016/0352635 A1 * | 12/2016 | Yoshizaki | ........... | H04L 12/6418 |
| 2017/0008111 A1 * | 1/2017 | Yoshizaki | ................ | B23H 1/10 |

FOREIGN PATENT DOCUMENTS

| | | |
|---|---|---|
| JP | S61-297057 A | 12/1986 |
| JP | H07-75937 A | 3/1995 |
| JP | 11-10446 A | 1/1999 |
| JP | 2012-200854 A | 10/2012 |

OTHER PUBLICATIONS

Mahapatra, S.S. and Patnaik, A., "Optimization of wire electrical discharge machining (WEDM) process parameters using Taguchi method", 2007, Int. Journal Advance Manufacturing Technology, 34, 911-925.*

Poros, D. and Zaborski, S., "Semi-empirical model of efficiency of wire electrical discharge machining of hard-to-machine materials", 2009, Journal of Materials Processing Technology, 209, 1247-1253.*

Tzeng, C.-J.; Yang, Y.-K.; Hsieh, M.-H. and Jeng, M.-C., "Optimization of wire electrical discharge machining of pure tungsten using neural network and response surface methodology", Feb. 11, 2010, Proc. IMechE vol. 225 Part B: J. Engineering Manufacture.*

Office Action dated Aug. 18, 2015, corresponding to Japanese Patent Application No. 2014-077264.

Office Action in Chinese Patent Application No. 2015101545490, dated Dec. 2, 2016.

Extended European Search Report dated Aug. 10, 2015, corresponding to European Patent Application No. 15160848.6.

* cited by examiner

SIDE VIEW

TOP VIEW

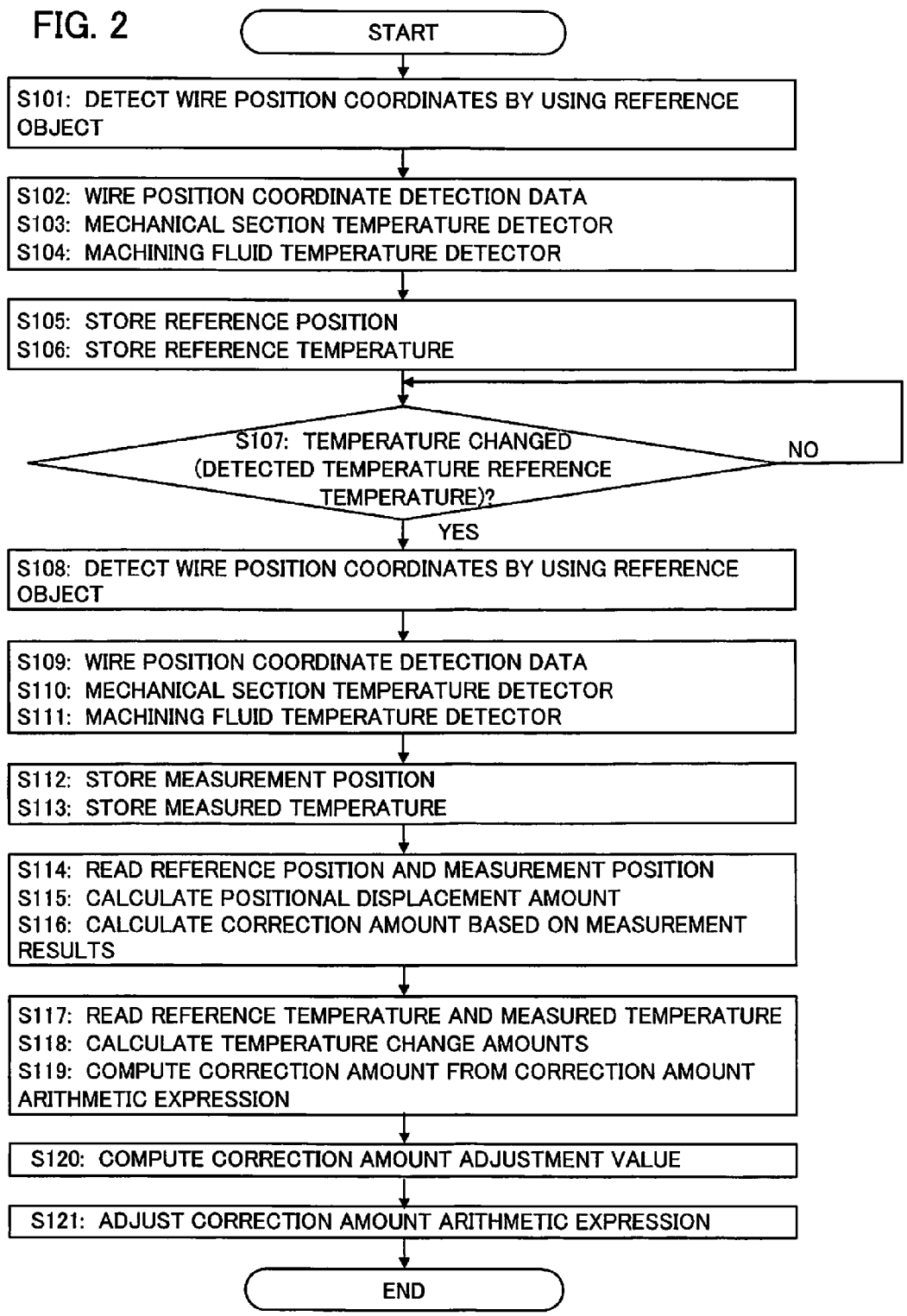

SIDE VIEW

TOP VIEW

WIRE ELECTRICAL DISCHARGE MACHINE HAVING UPPER/LOWER GUIDE THERMAL DISPLACEMENT CORRECTION FUNCTION

RELATED APPLICATIONS

The present application claims priority to Japanese Application Number 2014-077264, filed Apr. 3, 2014, the disclosure of which is hereby incorporated by reference herein in its entirety.

BACKGROUND OF THE INVENTION

1. Field of the Invention

The present invention relates to a wire electrical discharge machine and, more particularly, to a wire electrical discharge machine capable of correcting positional displacement (thermal displacement) of a wire electrode that is caused by thermal displacement of the machine.

2. Description of the Related Art

FIG. 5 is a schematic diagram illustrating a prior art wire electrical discharge machine. The wire electrical discharge machine machines a workpiece 29 by causing an electrical discharge between a wire electrode 1 and the workpiece 29.

The workpiece 29 placed on a workpiece mount is machined while it is immersed in a machining fluid in a work tank 6. The machining fluid including machined cuttings generated during machining is discharged from the work tank 6 to a wastewater tank 26 through a pipeline (not shown). The machining fluid collected in the wastewater tank 26 is filtered to remove the machined cuttings and then transferred to a freshwater tank 27. The freshwater tank 27 is provided with a machining fluid temperature regulator 28. The machining fluid temperature regulator 28 adjusts the temperature of the machining fluid stored in the freshwater tank 27 by pumping up the machining fluid from the freshwater tank 27 through a piping 37 and passing it through the machining fluid temperature regulator 28. The temperature-adjusted machining fluid is pumped up from the freshwater tank 27 by a pump (not shown) and fed back to the work tank 6 through pipelines 35, 36.

The positional relationship between the wire electrode 1 and the workpiece 29 is adjusted by a control unit 24 that drives motors for individual shafts. An X-axis drive motor 17 adjusts the relative positional relationship by moving an X-axis saddle 11, and a Y-axis drive motor 18 adjusts the relative positional relationship by moving a Y-axis saddle 10, to adjust the relative positional relationship between the wire electrode 1 and the workpiece 29. A U-axis drive motor 20 and a V-axis drive motor 21 determine the tilt of the wire electrode 1. The U-axis drive motor 20 determines the tilt of the wire electrode 1 by moving a U-axis saddle 13 to reposition an upper head section 7. The V-axis drive motor 21 determines the tilt of the wire electrode 1 by moving a V-axis saddle 14 to reposition the upper head section 7. A Z-axis drive motor 19 determines the vertical position of the upper head section 7.

As described above, the positional relationship between the wire electrode 1 and the workpiece 29 is adjusted by combining a plurality of mechanical sections. Position coordinates of each axis that are required for positional control of each axis are detected by a position detector built-in a motor for each axis.

The wire electrical discharge machine is thermally deformed when a change occurs in a temperature environment in which it is installed, in the temperature of a mechanical section, or in the temperature of the machining fluid. Such thermal deformation causes thermal displacement in which the position and tilt of the wire electrode are displaced from the position and tilt commanded for machining purposes. If the position and tilt of the wire electrode are displaced, the positional relationship between the wire electrode 1 and the workpiece 29 changes to decrease the accuracy of machining. As such being the case, when high machining accuracy is required, it is necessary to perform machining not to cause the thermal displacement while the wire electrical discharge machine is installed in a temperature-controlled environment such as a thermostatic chamber.

However, controlling the temperature of a machine installation environment requires the use of a temperature control facility, that is, involves a large amount of investment and operating cost. In reality, therefore, many users cannot afford to use a temperature control facility.

Japanese Patent Application Laid-Open No. 61-297057 or No. 7-75937 discloses a thermal displacement correction function that provides against thermal displacement of a machine tool by acquiring temperature information with temperature detectors disposed in various sections of a machine, computing a correction value for thermal displacement, and subjecting each axis to drive control based on the computed correction value in order to suppress relative positional displacement between the wire electrode 1 and the workpiece 29. When the above-described thermal displacement correction function is used to give an appropriate correction value, the relative positional relationship between the wire electrode 1 and the workpiece 29 remains unchanged even in an environment where the temperature changes. This makes it possible to suppress a decrease in the machining accuracy.

However, mechanical components of the wire electrical discharge machine are assembled from a plurality of mechanical elements and formed of different types of members. Further, as the environment in which the wire electrical discharge machine is installed varies from one user to another, it is difficult to set a thermal displacement correction value suitable for all temperature environments. A discrepancy occurs between a correction value preset for thermal displacement and an actual thermal displacement of the machine depending on the temperature environment and on the difference between one wire electrical discharge machine and another. In some cases, therefore, appropriate corrections cannot be made.

It has been difficult for the users to adjust the difference between a preset correction value and actual thermal displacement and compute a correction value appropriate for a user-specific temperature environment because it has been necessary, for example, to make measurements with an accurate measuring instrument, install a measurement sensor for making measurements, and rewrite a complex correction value computation program.

SUMMARY OF THE INVENTION

In view of the above-described problems in the prior art techniques, an object of the present invention is accordingly to provide a wire electrical discharge machine that makes it easy to set a thermal displacement correction value suitable for a machine-specific temperature environment.

A wire electrical discharge machine having an upper/lower guide thermal displacement correction function according to the present invention corrects upper/lower guide thermal displacement caused by changes in an installation environment and in a machine temperature by relatively moving a wire electrode and a workpiece. The wire electrical discharge machine includes a temperature detection unit, a storage unit, a first storage execution unit, a second storage execution unit, an actual position correction amount calculation unit, a correction amount calculation unit, a correction amount adjustment unit, a position correction amount adjustment unit, and a corrective movement amount calculation unit. The temperature detection unit is configured to detect at least one of the mechanical section temperature, machining fluid temperature, and machine ambient temperature of the wire electrical discharge machine. The storage unit is configured to store temperature information acquired by the temperature detection unit. The first storage execution unit is configured to command individual drive shafts at a reference temperature to relatively move the wire electrode with respect to a reference object, brings the wire electrode into contact with the reference object, and stores the position of the wire electrode in the form of reference position coordinates in the storage unit together with the reference temperature. The second storage execution unit is configured to command the individual drive shafts at a temperature different from the reference temperature to relatively move the wire electrode with respect to a reference object, brings the wire electrode into contact with the reference object, and stores the position of the wire electrode in the form of actual position coordinates in the storage unit together with the temperature different from the reference temperature. The actual position correction amount calculation unit is configured to calculate an actual position correction amount for an upper/lower guide section in accordance with the reference position coordinates and with the actual position coordinates. The correction amount calculation unit is configured to store a prepared correction amount arithmetic expression and calculates a position correction amount for the upper/lower guide section by substituting a temperature difference between the reference temperature and the temperature different from the reference temperature into the correction amount arithmetic expression. The correction amount adjustment unit is configured to calculate a correction amount adjustment value from the actual position correction amount for the upper/lower guide section and from the position correction amount therefor. The position correction amount adjustment unit is configured to correct the position correction amount based on the calculated correction amount adjustment value. The corrective movement amount calculation unit is configured to calculate a corrective movement amount for each of the individual drive shafts of the wire electrical discharge machine in accordance with the position correction amount for the upper/lower guide section, which is corrected by the position correction amount adjustment unit. The movement amount for each of the individual drive shafts is corrected by using the corrective movement amount and used to control each of the individual drive shafts.

As the present invention has the above-described configuration, it provides a wire electrical discharge machine that easily sets a thermal displacement correction value suitable for a machine-specific temperature environment.

BRIEF DESCRIPTION OF THE DRAWINGS

The above and other objects and features of the present invention will be apparent from the following description of an embodiment that is given with reference to the appended drawings, in which:

FIG. 2 is a flowchart illustrating a process according to an embodiment of the present invention;

DETAILED DESCRIPTION OF THE PREFERRED EMBODIMENT

Figure 1A:
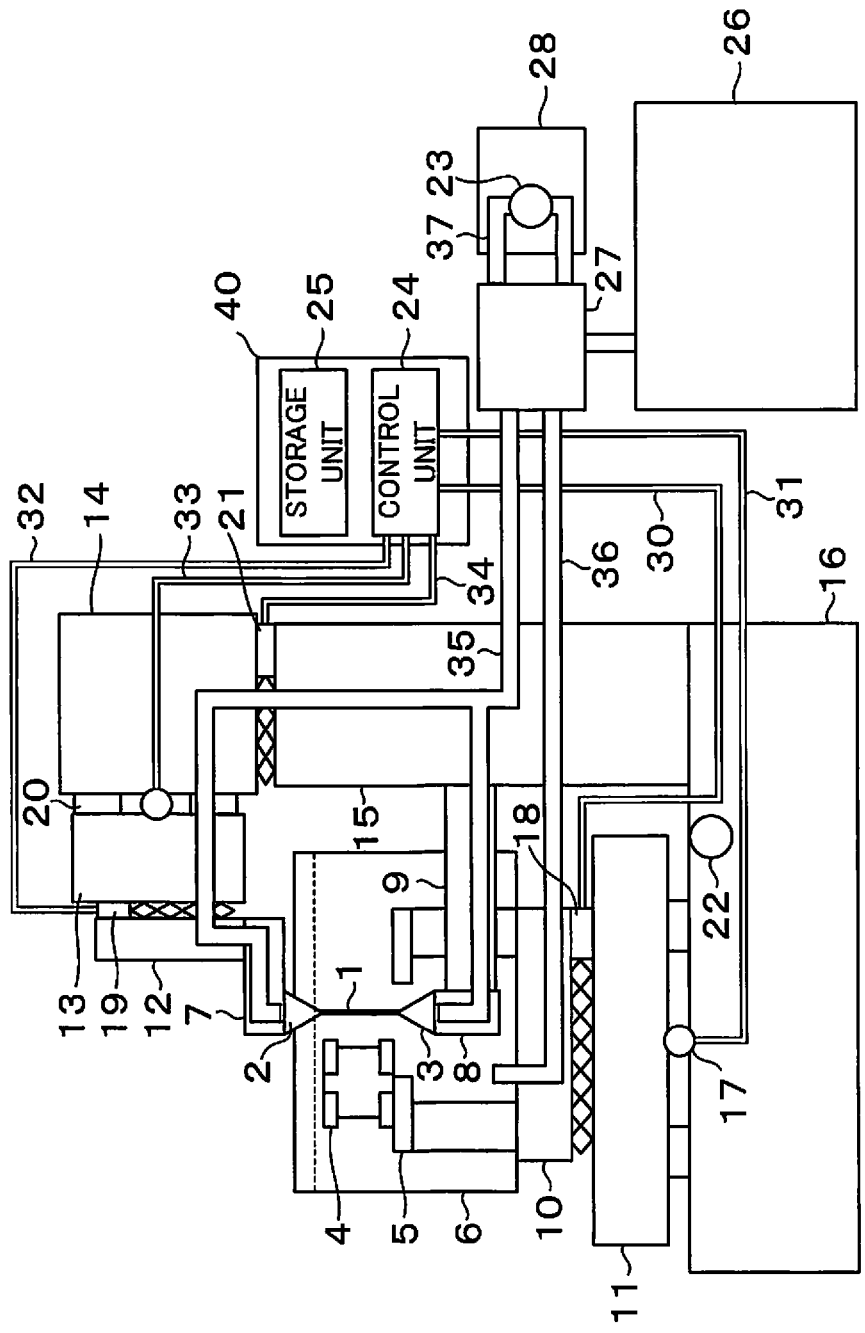
FIG. 1A is a diagram illustrating an electrical discharge machine having an apparatus according to an embodiment of the present invention.

Elements identical with or similar to those used with prior art techniques will be described by using the same reference numerals as those of the corresponding elements.

FIG. 1A is a schematic diagram illustrating the adjustment of a thermal displacement correction value for a wire electrical discharge machine according to an embodiment of the present invention.

A machining fluid is discharged from a work tank 6 to a wastewater tank 26 through a piping (not shown). As the machining fluid discharged from the work tank 6 to the wastewater tank 26 includes machined cuttings generated during electrical discharge machining, it is transferred to a freshwater tank 27 through a filter (not shown). A machining fluid temperature regulator 28 is disposed in the freshwater tank 27. When the machining fluid in the freshwater tank 27 circulates in the machining fluid temperature regulator 28 through a pipeline 37, the machining fluid temperature regulator 28 adjusts the temperature of the machining fluid. The machining fluid in the freshwater tank 27 is then fed back to the work tank 6 through pipelines 35, 36. Some pumps, used to pump the machining fluid from the freshwater tank 27 to the work tank 6, are not shown in the figures.

The relative positional relationship between a wire electrode 1 and a reference object 4 varies when motors of individual shafts are driven by a control unit 24 of a control device 40. An X-axis saddle 11 is driven by an X-axis drive motor 17, which is controlled by the control unit 24 through a Y-axis drive motor signal line 31. A Y-axis saddle 10 is driven by a Y-axis drive motor 18, which is controlled by the control unit 24 through an X-axis drive motor signal line 30. Driving the X-axis saddle 11 and the Y-axis saddle 10 in the above manner determines the relative XY-direction positional relationship between the wire electrode 1 and the reference object 4.

A U-axis saddle 13 is driven by a U-axis drive motor 20, which is controlled by the control unit 24 through a U-axis drive motor signal line 33. A V-axis saddle 14 is driven by a V-axis drive motor 21, which is controlled by the control unit 24 through a V-axis drive motor signal line 34. Driving the U-axis saddle 13 and the V-axis saddle 14 in the above manner changes the UV-direction position of an upper head section 7 to determine the tilt of the wire electrode 1.

A Z-axis drive motor 19, which is driven by the control unit 24 through a Z-axis drive motor signal line 32, determines the height of the upper head section 7, which is mounted on a Z-axis saddle 12. The wire electrode 1 is positioned while its position is detected by a position detector built in each of the drive motors 17, 18, 19, 20, 21 for the individual shafts.

The wire electrode 1 is tightly stretched between an upper guide 2 mounted on the upper head section 7 and a lower guide 3 mounted on a lower head section 8. The control device 40 of the wire electrical discharge machine applies a contact detection voltage between the wire electrode 1 and the reference object 4. As shown in FIG. 1A, while the reference object 4 is placed on a workpiece mount 5 and immersed in the machining fluid in the work tank 6, the shafts of the wire electrical discharge machine are driven to measure the position of each axis by detecting the contact between the wire electrode 1 and the reference object 4. The measured data about the position of each axis is stored in a storage unit 25 of the control device 40. The reference numeral 9 denotes a lower arm. The reference numeral 15 denotes a column.

A mechanical section temperature detector 22 is disposed in a bed 16. A machining fluid temperature detector 23 is disposed in the machining fluid temperature regulator 28. These temperature detectors 22, 23 acquire temperature information about a mechanical section and machining fluid of the wire electrical discharge machine. The number of temperature detectors for acquiring the temperature information is not limited. The present embodiment uses the temperature detectors disposed at two locations. However, an alternative is to use more temperature detectors and use only one temperature detector. The locations at which the temperature detectors are disposed are determined by a machine designer and not limited to the bed 16 and the machining fluid temperature regulator 28. Data about the temperatures of the bed 16 and machining fluid, which are detected respectively by the mechanical section temperature detector 22 and the machining fluid temperature detector 23, is stored in the storage unit 25 of the control device 40.

The temperatures to be detected are not limited to the mechanical section temperature and the machining fluid temperature. For example, the temperatures of mechanical parts, the ambient temperature of the machine, and the machining fluid temperature may be detected. The acquired temperature information is transmitted to the storage unit 25. The reference object 4 is placed on the workpiece mount 5. The reference object 4 to be used should be formed of an electrifiable material.

Figure 1B:
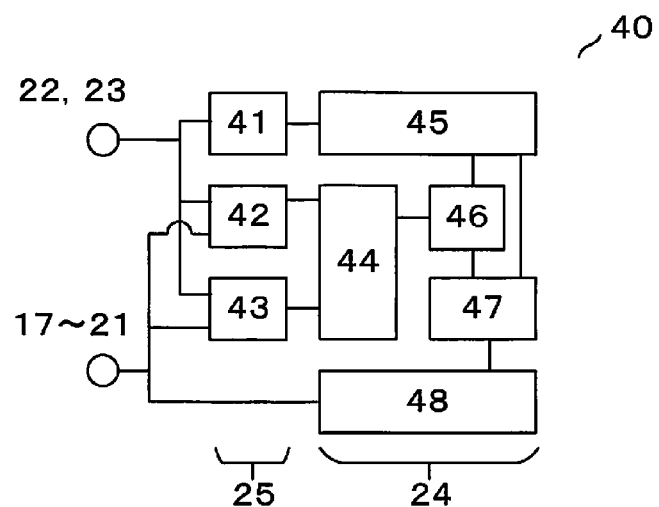
FIG. 1B is a schematic diagram illustrating an exemplary configuration of a control device.

FIG. 1B is a schematic diagram illustrating an exemplary configuration of the control device 40. The control device 40 includes the control unit 24 and the storage unit 25.

As described later, the storage unit 25 includes a temperature information storage unit 41, a first storage execution unit 42, and a second storage execution unit 43. The temperature information storage unit 41 stores temperature information. The first storage execution unit 42 stores a reference temperature and reference position coordinates related to the reference temperature. The second storage execution unit 43 stores actual position coordinates related to a temperature different from the reference temperature and the temperature different from the reference temperature. The temperature information storage unit 41, the first storage execution unit 42, and the second storage execution unit 43 are all connected to the mechanical section temperature detector 22 and machining fluid temperature detector 23 in the control device 40. The first storage execution unit 42 and the second storage execution unit 43 are both connected to the drive motors 17, 18, 19, 20, 21 for the individual shafts in the control device 40.

Further, as described later, the control unit 24 includes an actual position correction amount calculation unit 44, a correction amount calculation unit 45, a correction amount adjustment unit 46, a position correction amount adjustment unit 47, and a corrective movement amount calculation unit 48. The actual position correction amount calculation unit 44 is connected to the first storage execution unit 42 and the second storage execution unit 43 in order to calculate an actual position correction amount for the upper/lower guide section. The correction amount calculation unit 45 is connected to the temperature information storage unit 41 in order to calculate a position correction amount for the upper/lower guide section. The correction amount adjustment unit 46 is connected to the correction amount calculation unit 45 and the actual position correction amount calculation unit 44 in order to calculate a correction amount adjustment value. The position correction amount adjustment unit 47 is connected to the correction amount calculation unit 45 and the correction amount adjustment unit 46. The corrective movement amount calculation unit 48 is connected to the position correction amount adjustment unit 47 in order to calculate a corrective movement amount for each drive shaft of the wire electrical discharge machine.

In the control device, the control unit 24 may be formed of a single CPU, and the storage unit 25 may be formed of a single memory.

Figure 3A:
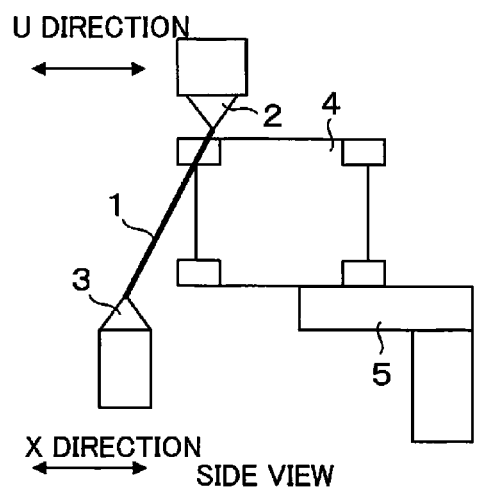
FIGS. 3A and 3B are diagrams illustrating an operation that is performed to detect wire position coordinates by using a reference object (upper position)
Figure 3B:
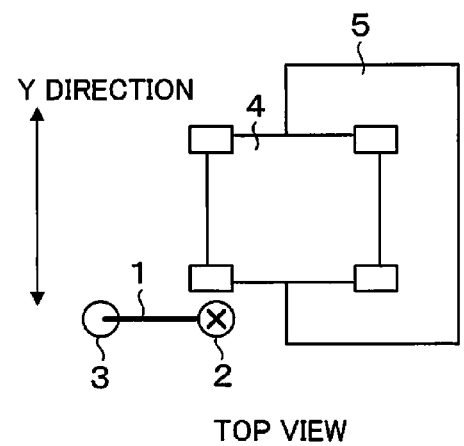
Figure 4A:
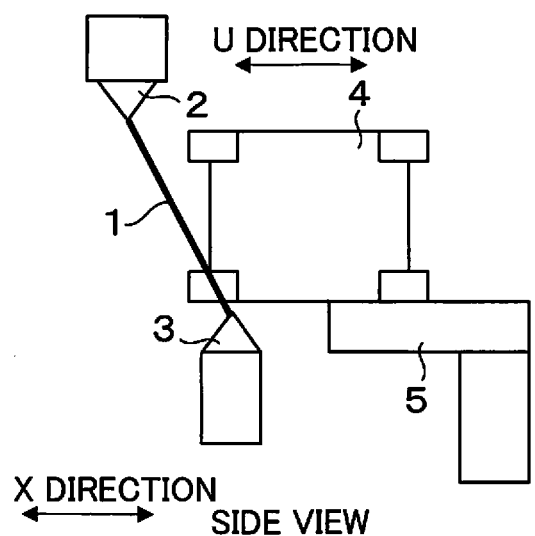
FIGS. 4A and 4B are diagrams illustrating an operation that is performed to detect wire position coordinates by using a reference object (lower position)
Figure 4B:
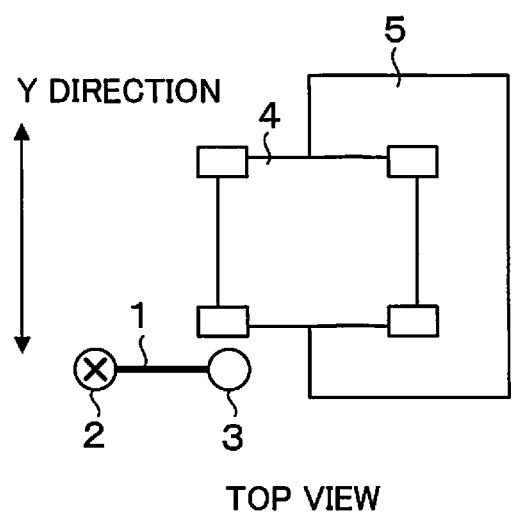
Figure 5:
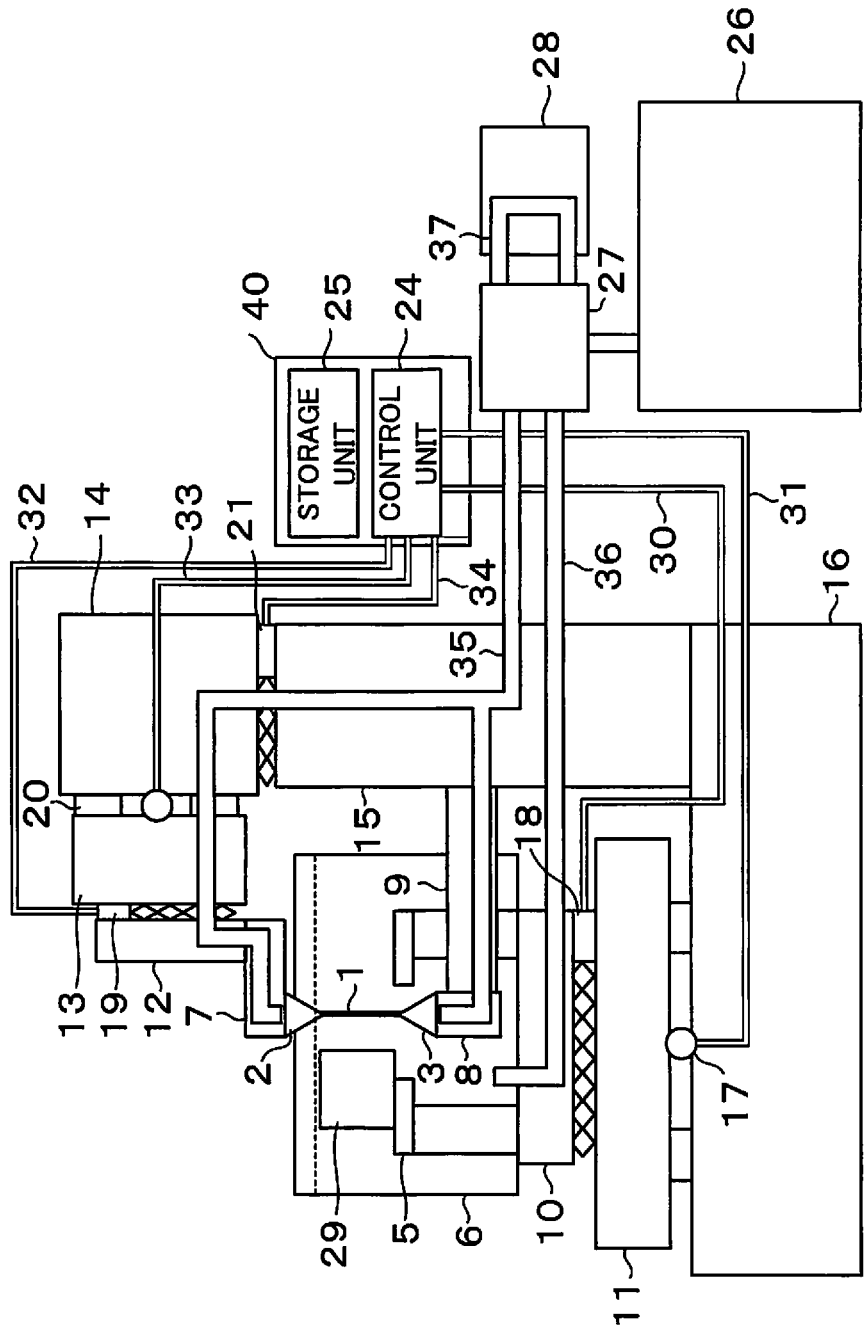
FIG. 5 is a schematic diagram illustrating a prior art wire cutting electrical discharge machine.

An example of an operation performed by the wire electrical discharge machine having the above-described configuration according to an embodiment of the present invention will now be described with reference to steps of a process depicted in FIG. 2. FIGS. 3A and 3B and FIGS. 4A and 4B are diagrams illustrating an operation that is performed to detect wire position coordinates by using a reference object. The reference object 4 is fastened to the workpiece mount 5. FIGS. 3A and 3B and FIGS. 4A and 4B are diagrams illustrating a case where the Y-direction tilt of the wire electrode 1 is measured. FIGS. 3A and 3B are diagrams illustrating an operation that is performed to detect wire position coordinates by using a reference object (upper position). FIGS. 4A and 4B are diagrams illustrating an operation that is performed to detect wire position coordinates by using a reference object (lower position).

The drive motors (18, 21, 17, 20) for the Y- and V-axes or for the X- and U-axes are driven to bring the wire electrode 1 into contact with the reference object 4. When the wire electrode 1 comes into contact with the reference object 4, a current flowing in the wire electrode 1 flows to the reference object 4. This change in the current is detected to detect the wire position coordinates of each axis at which the wire electrode 1 comes into contact with the reference object 4 (step S101).

The detection in step S101 of the wire position coordinates at which the wire electrode 1 comes into contact with the reference object 4 will now be described with reference to a case where the Y- and U-axes are driven.

First of all, the coordinates of the Y- and U-axes at which a measurement starts are stored as (Y00, V00). Subsequently, as shown in FIG. 3A, the U-axis is moved to move the upper guide 2 in the U direction so that only the wire electrode 1 near the upper guide 2 is tilted to come into contact with the reference object 4. Then, as shown in FIG. 3B, the Y-axis is driven to move the tilted wire electrode 1 in the Y direction so that the wire electrode 1 comes into contact with the reference object 4.

The wire electrode 1 is electrified. Therefore, when the wire electrode 1 comes into contact with the reference object 4, a current flows to the reference object 4. Thus, the current flow to the reference object 4 is detected to detect the contact between the wire electrode 1 and the reference object 4. The Y coordinates at which the wire electrode 1 is brought into contact with the reference object 4 are stored as the position coordinates "Y upper" of the upper guide 2 (the storage unit 25 of the control device 40).

As for the position coordinates "Y lower" of the lower guide 3, too, the contact between the wire electrode 1 and the reference object 4 is detected while the wire electrode 1 is tilted as shown in FIGS. 4A and 4B. The detected position coordinates "Y upper" and position coordinates "Y lower" are used so that data about the Y- and V-axis wire position coordinates (Y0, V0) at which the wire electrode 1 comes into contact with the reference object 4 is calculated by the equations Y0=Y lower, V0=V00+Y upper−Y lower.

As for the X- and U-axes, too, the wire electrode 1 is tilted and brought into contact with the reference object 4, as is the case with the Y- and V-axes, in order to measure the measurement position coordinates (X0, U0) of the X- and U-axes at which the wire electrode 1 is brought into contact with the reference object 4.

The wire position coordinate data about each axis, which is detected in step S102 by using the reference object 4, is stored as the reference position (step S105). Temperature information prevailing at the time of reference position detection is detected by each temperature detector (mechanical section temperature detector 22 and machining fluid temperature detector 23) (steps S103 and S104), and stored in a storage device as the reference temperature (step S106). As a result, the reference position and the reference temperature, which represent the position and tilt of the wire electrode 1 and temperature information that prevail before thermal displacement, are detected and stored.

Subsequently, the detected temperature is monitored to determine whether it has varied from the reference temperature (step S107). Then, in a state where the detected temperature has varied from the reference temperature to cause thermal displacement, each axis is driven again (see FIGS. 3A and 3B and FIGS. 4A and 4B), and the data about the wire position coordinates (Y1, V1) of the Y- and V-shafts at which the wire electrode 1 comes into contact with the reference object 4 and the data about the wire position coordinates (X1, U1) of the X- and U-shafts at which the wire electrode 1 comes into contact with the reference object 4 are detected (step S108) in the same manner as in step S101.

The wire position coordinate data about each axis, which is detected in step S109 by using the reference object in a state where the temperature has varied from the reference temperature, is stored as the measurement position (step S112). The temperature information detected at the time of measurement position detection by each temperature detector (mechanical section temperature detector 22 and machining fluid temperature detector 23) (steps S110 and S111) is stored in the storage unit 25 as the measured temperature (step S113).

The reference position (step S105) and the measurement position (step S112) are read from the storage unit 25 of the control device 40 (step S114). The amount of positional displacement of the upper guide 2 and of the lower guide 3, which is caused by thermal displacement, is calculated from the difference between the reference position and the measurement position (step S115), and an optimal correction amount is calculated in accordance with the result of measurement (step S116).

Further, the reference temperature and the measured temperature are read from the storage unit 25 of the control device 40 (step S117), and the difference between the reference temperature (step S106) and the measured temperature (step S113) is calculated as a temperature change amount (step S118).

A correction amount for the calculated temperature change amount is computed by using a correction amount arithmetic expression stored in the storage device by a manufacturer (step S119). The optimal correction amount based on the measurement result, which is calculated in step S116, is compared against the correction amount computed from the correction amount arithmetic expression that is stored and used for computation in step S119 in order to compute a correction amount adjustment value (step S120). The correction amount adjustment value computed in step S120 is used to adjust the correction amount arithmetic expression for the measurement result (step S121).

The adjustment of the correction amount arithmetic expression in steps S114 to S121 will now be described with reference to the Y- and V-shafts.

When the reference position is (Y0, V0) and the measurement position is (Y1, V1), the measured positional displacement amount A1 of the upper guide 2 and the measured positional displacement amount A2 of the lower guide 3 are calculated respectively from the following equations (step S115).

$$A1 = Y0 - Y1 + V1 - V0 \qquad (1)$$

$$A2 = Y0 - Y1 \qquad (2)$$

Thus, the optimal position correction amount B1 for the upper guide 2 and the optimal position correction amount B2 for the lower guide 3, which are based on the above positional displacement amounts, are calculated from the following equations (step S116).

$$B1 = -A1 \qquad (3)$$

$$B2 = -A2 \qquad (4)$$

The reference temperatures (T01, T02) and measured temperatures (T11, T12), which are detected by the mechanical section temperature detector 22 and the machining fluid temperature detector 23 and stored in the storage unit 25, are read (step S117).

The temperature change amounts (T21, T22) are calculated from the following equations (step S118).

$$T21 = T11 - T01 \qquad (5)$$

$$T22 = T12 - T02 \qquad (6)$$

Let us assume, for example, that the correction amount arithmetic expressions for the upper and lower guide positions, which are prepared by the manufacturer of the wire electrical discharge machine and stored in the storage unit 25, are as follows.

$$D1 = C1T1 + C2T2 \qquad (7)$$

$$D2 = C3T1 + C4T2 \qquad (8)$$

D1 is a correction amount for the upper guide position. D2 is a correction amount for the lower guide position. T1 is a temperature change amount of the mechanical section temperature detector 22. T2 is a temperature change amount of the machining fluid temperature detector 23. C1, C2, C3, and C4 are arbitrary coefficients. The correction amount arithmetic expressions are determined in accordance, for instance, with the results of experiments conducted by the manufacturer. Equations (7) and (8) are merely examples.

When the temperature change amounts (T21, T22) calculated in step S118 are substituted into the correction amount arithmetic expressions (Equations (1) and (2)) to compute a correction amount E1 for the upper guide 2 and a correction amount E2 for the lower guide 3, the following equations are obtained (step S119).

$$E1 = C1T21 + C2T22 \quad (9)$$

$$E2 = C3T21 + C4T22 \quad (10)$$

The correction amount adjustment values F1, F2 for comparing and adjusting the position correction amounts E1, E2 for the upper and lower guides 2, 3, which are computed from the correction amount arithmetic expressions of equations (3) and (4), and the optimal position correction amount B1 for the upper guide 2 and optimal position correction amount B2 for the lower guide 3, which are computed in step S116 and based on the results of actual measurements, are computed from the following equations (step S120).

$$F1 = B1/E1 \quad (11)$$

$$F2 = B2/E2 \quad (12)$$

When the correction amount adjustment values F1, F2 for the upper guide 2 and the lower guide 3 computed in step S120 are used to optimize the position correction amounts computed from Equations (7) and (8) in accordance with the measurement results, the following equations are obtained.

$$D1 \Rightarrow F1D1 \quad (13)$$

$$D2 \Rightarrow F2D2 \quad (14)$$

Arithmetic expressions for correction amounts Y, V for the V- and Y-axes are as follows.

$$Y = D2 \quad (15)$$

$$V = D1 - D2 \quad (16)$$

Thus, the arithmetic expressions for the correction amounts Y, V for the Y- and V-axes are as follows when the measurement results are taken into account.

$$Y = F2D2 \quad (17)$$

$$V = F1D1 - F2D2 \quad (18)$$

Hence, when corrective movements are to be made, adjustments are made so as to correct in accordance with Equations (17) and (18) (step S121).

When the above correction value adjustments are made for setup purposes, the correction value arithmetic expressions are adjusted in accordance with the measurement results. This ensures that corrective movements are made in accordance with the adjusted correction amounts, which are computed for the Y- and V-axes. As for the X- and U-axes, too, rewriting the computed correction amounts in the same manner as for the Y- and V-axes converts the correction values in accordance with detection results.

In a temperature environment for the wire electrical discharge machine in which actual machining is performed, the wire electrode 1 used for machining is directly used to detect and calculate the amounts of changes in the position and tilt of the wire electrode 1 due to thermal displacement and the amount of the resulting temperature change. As the correction values for thermal displacement are computed in accordance with the results of detection and calculation, it is possible to set correction values more suitable for respective conditions.

Further, the position coordinates of each axis are detected by bringing the wire electrode 1 into contact with the reference object 4, and the temperature information detected by each temperature detector 22, 23 is stored, so that correction value computations for thermal displacement are automatically performed by the control unit 24 of the control device 40. As a result, correction value setup can be easily performed with a minimum of human error.

Position detection is also achieved by using the wire electrode 1 that is actually used for machining and by moving the shafts of the machine. Therefore, correction value adjustments can be made without having to prepare a measuring instrument, a detection sensor, a detector, or the like. In addition, measurements can be made under conditions that are closer to those for machining.

The foregoing description has been made on the assumption that the temperatures of the mechanical section and machining fluid are used while the temperature detector 22 is disposed in the bed 16, which is one mechanical section, and the temperature detector 23 is disposed in the machining fluid temperature regulator 28. However, the adjustments can be made in the same manner even if the machining fluid temperature is detected in a different mechanical section or in a different location or the number of temperature detection unit is increased. Further, only one of the temperature detector 22 and the temperature detector 23 may be used as the temperature detection unit to correct the thermal displacement of the upper/lower guide in accordance with the detected temperature information. Moreover, a temperature detector may detect the temperature of an environment in which the machine is installed and the thermal displacement of the upper/lower guide may be corrected in accordance with information about the temperature of an environment in which the machine is installed.

Consequently, the above-described embodiment makes it possible to compute a thermal displacement correction value suitable for a machine-specific temperature environment and perform thermal displacement correction value setup with ease without preparing an additional measuring instrument.

The machine-specific temperature environment includes, for example, the temperatures of mechanical parts, the ambient temperature of the machine, and the machining fluid temperature.

The invention claimed is:

1. A wire electrical discharge machine having an upper/lower guide thermal displacement correction function that corrects upper/lower guide section thermal displacement by relatively moving a wire electrode and a workpiece, the wire electrical discharge machine comprising:
   a temperature detection unit configured to detect at least one of the mechanical section temperature, machining fluid temperature, and machine ambient temperature of the wire electrical discharge machine;
   a storage unit configured to store temperature information acquired by the temperature detection unit;
   a first storage execution unit configured to command individual drive shafts at a reference temperature to relatively move the wire electrode with respect to a reference object, bring the wire electrode into contact with the reference object, and store the position of the wire electrode in the form of reference position coordinates in the storage unit together with the reference temperature;
   a second storage execution unit configured to command the individual drive shafts at a temperature different from the reference temperature to relatively move the wire electrode with respect to a reference object, bring the wire electrode into contact with the reference object, and store in the storage unit the position of the wire electrode in the form of measured position coordinates in the storage unit together with the temperature different from the reference temperature;

a correction amount calculation unit on the basis of a measured result configured to calculate a correction amount for an upper/lower guide section in accordance with the reference position coordinates and the measured position coordinates;

a correction amount calculation unit configured to store a prepared correction amount arithmetic expression and calculate a position correction amount for the upper/lower guide section by substituting a temperature difference between the reference temperature and the temperature different from the reference temperature into the correction amount arithmetic expression;

a correction amount adjustment unit configured to calculate a correction amount adjustment value from the correction amount on the basis of the measured result for the upper/lower guide section and from the position correction amount therefor;

a position correction amount adjustment unit configured to correct the position correction amount based on the calculated correction amount adjustment value; and a corrective movement amount calculation unit configured to calculate a corrective movement amount for each of the individual drive shafts of the wire electrical discharge machine in accordance with the position correction amount for the upper/lower guide section, which is corrected by the position correction amount adjustment unit;

wherein the movement amount for each of the individual drive shafts is corrected by using the corrective movement amount and used to control each of the individual drive shafts.

2. The wire electrical discharge machine according to claim 1, further comprising:

a machining fluid temperature regulator configured to adjust the machining fluid temperature of a machining fluid, wherein the temperature detection unit includes
a first temperature detector disposed at a mechanical section of the wire electrical discharge machine and configured to detect the mechanical section temperature, and
a second temperature detector disposed in the machining fluid temperature regulator and configured to detect the machining fluid temperature.

3. The wire electrical discharge machine according to claim 1, further comprising:

a control unit configured to detect the position of the wire electrode by a contact of the wire electrode with the reference object.

4. The wire electrical discharge machine according to claim 1, further comprising:

a control unit configured to
monitor the temperature detected by the temperature detection unit, and
determine whether the detected temperature varies from the reference temperature,
wherein
the second storage execution unit is configured to command the individual drive shafts to bring the wire electrode into contact with the reference object when the control unit determines that the detected temperature varies from the reference temperature.

* * * * *